(12) United States Patent
Proctor et al.

(10) Patent No.: US 7,593,220 B2
(45) Date of Patent: Sep. 22, 2009

(54) LAMP WITH CHARGING DEVICE AND PLAYING DEVICE FOR PORTABLE AUDIO PLAYER

(75) Inventors: Bonnie J. Proctor, Elburn, IL (US); Matthew T. Proctor, Pingree Grove, IL (US)

(73) Assignee: Challenger Lighting Compnay, Inc., Elgin, IL (US)

(*) Notice: Subject to any disclaimer, the term of this patent is extended or adjusted under 35 U.S.C. 154(b) by 310 days.

(21) Appl. No.: 11/406,764

(22) Filed: Apr. 19, 2006

(65) Prior Publication Data

US 2007/0247790 A1   Oct. 25, 2007

(51) Int. Cl.
*H05K 5/00* (2006.01)
*H05K 7/00* (2006.01)

(52) U.S. Cl. .................................. 361/679.23

(58) Field of Classification Search ................. 361/679, 361/642, 643, 686; 455/42, 573; 439/638, 439/652, 668, 699.2
See application file for complete search history.

(56) References Cited

U.S. PATENT DOCUMENTS

| | | | |
|---|---|---|---|
| 6,591,085 B1* | 7/2003 | Grady | 455/42 |
| 7,280,802 B2* | 10/2007 | Grady | 455/42 |
| 2004/0162029 A1* | 8/2004 | Grady | 455/42 |
| 2005/0014536 A1* | 1/2005 | Grady | 455/573 |
| 2006/0127034 A1* | 6/2006 | Brooking et al. | 386/46 |

* cited by examiner

*Primary Examiner*—Chandrika Prasad
(74) *Attorney, Agent, or Firm*—Mathew R. P. Perrone, Jr.; Brie A. Crawford

(57) ABSTRACT

A holding device provides, in combination, a device for lighting a desired area, and recharging the battery of or playing a portable receiving device adapted to play music or material as stored therein or received thereby from television or radio sources.

18 Claims, 11 Drawing Sheets

LAMP WITH CHARGING DEVICE AND PLAYING DEVICE FOR PORTABLE AUDIO PLAYER

This invention relates to a device for charging or playing a portable sound device, and more particularly to a combination device, which provides a separate lighting source, a member for storing and charging the portable sound device, speakers for playing sound or music from the portable sound device, and a charger.

BACKGROUND OF THE INVENTION

In recent years, new devices for playing stored musical information have become available to the public. These are generically known as digital media players or MP3 players. A digital media player includes but is not limited to audio players, video players, or other similar devices. One example of such a device is available from Apple Computers, Inc. under the Trademark ipod. Other similar devices are also available.

Music listeners can now, among other things, play music stored in computerized format from a portable hard drive device, like this digital media player. Normally these devices consist of a hard drive connected to a graphical user interface, means for selecting a particular file, and a means for converting the information stored from computer format into electrical signals for a speaker. These devices can store an enormous amount of information when compared to previous storage devices such as a compact disc, or a cassette tape.

Typical of these devices is the iPod manufactured by Apple Computers, Inc. There are also other devices capable of downloading from a computer. These devices are easily portable and permit a person to make music selections to suit a particular taste in music. They also have durable, rechargeable batteries. It very desirable to simplify the recharging of those batteries, and permit the continued playing of the device powered by the batteries.

In addition to music which can be played on the portable sound device, other radio or video information may be displayed or heard as a result of the portable sound device. While these devices normally come equipped with attendant headphones for listening to the music, music equipment manufacturers are now adapting their products to take advantage of this new music storage medium. For example, vehicle manufacturers include the option of plugging portable music devices into some car stereos.

In addition, prior art devices permit a user to plug the device into a set of speakers. Consequently, music lovers are increasingly capable of enjoying a great portion or even their entire music collection regardless of location. This is especially desirable when a traveler is in a hotel or motel.

However, the portability of the devices necessarily implies certain drawbacks. More particularly, the devices require separate headphones or speakers for listening to the music, a power supply for charging the unit, and lighting for ease of use. All of these necessities are spatially inefficient and can cause disorganization. Normally, the user must purchase and keep track of all of these devices separately.

While prior art exists which combines the charger, and either the lighting unit or the speakers; no prior art exists, which shows the capability of combining all of the features. More importantly, no prior art arrangement organizes the above-mentioned features in a manner which maximizes the utilities gained through their combination. Great efficiencies can be gained if the equipment is combined in a calculated manner. Unfortunately, no device capable of combining all of the features exists.

SUMMARY OF THE INVENTION

Among the many objectives of this invention is the provision of a portable sound device for playing music from a portable music device.

A further objective of this invention is the provision of a device which provides speakers for a portable sound device.

A still further objective of this invention is the provision of a device for charging a portable music or sound device.

A still further objective of this invention is the provision of a device, which provides lighting as a part of operating a portable music or sound device.

Yet a further objective of this invention is the provision of a portable music or sound device, which provides lighting for a room.

Also an objective of this invention is the provision of a holding device, which provides speakers, a charger, and lighting for a portable music device.

Yet another objective of this invention is the provision of a holding device, which combines the speakers, the charger, and the lighting in an area capable of fitting on a small table.

Yet a further objective of this invention is the provision of a holding device, which combines the speakers, the charger, and the lighting in an area capable of being mounted on a wall.

Another objective of this invention is the provision of a holding device, which maximizes the utility gained by combining speakers, a charger, and lighting for a portable music device.

These and other objectives of the invention (which other objectives become clear by consideration of the specification, claims and drawings as a whole) are met by providing a portable sound device capable of use with a holding device, which is in turn capable of providing a lighting, charging, and playing function in combination with a portable, rechargeable, musical or radio receiver device.

BRIEF DESCRIPTION OF THE DRAWINGS

Throughout the figures of the drawings, where the same part appears in more than one figure of the drawings, the same number is applied thereto.

DESCRIPTION OF THE PREFERRED EMBODIMENTS

In accordance with the present invention, a holding device which includes a lamp with a charger and speakers for a digital media player is shown. In this embodiment, the digital media player is the equivalent of a portable music player or sound device or audio player. Furthermore, the charger is the equivalent of or may also be used as a docking station. The holding device supports a number of elements and provides both power and operating support thereto. This arrangement takes advantage of the structure of the lamp in order to provide the elements, including but not limited to; lighting, charging, and speakers for the portable music device in the most efficient manner possible.

Consequently, the details of the arrangement will be governed by the particular lamp style employed. However, each lamp permits the user to play music through the provided speakers while the portable music player or audio player is plugged into the charger provided on the holding device. This structure of the holding device provides for more efficient use of confined quarters.

Typical of the places this devices may be used is a motel or a hotel. This structure provides a simplified method for the traveler to maintain access to desired music or news sources, or similar material, when in a room thereof. Further, the sound from the personal device is greatly improved.

Figure 1:
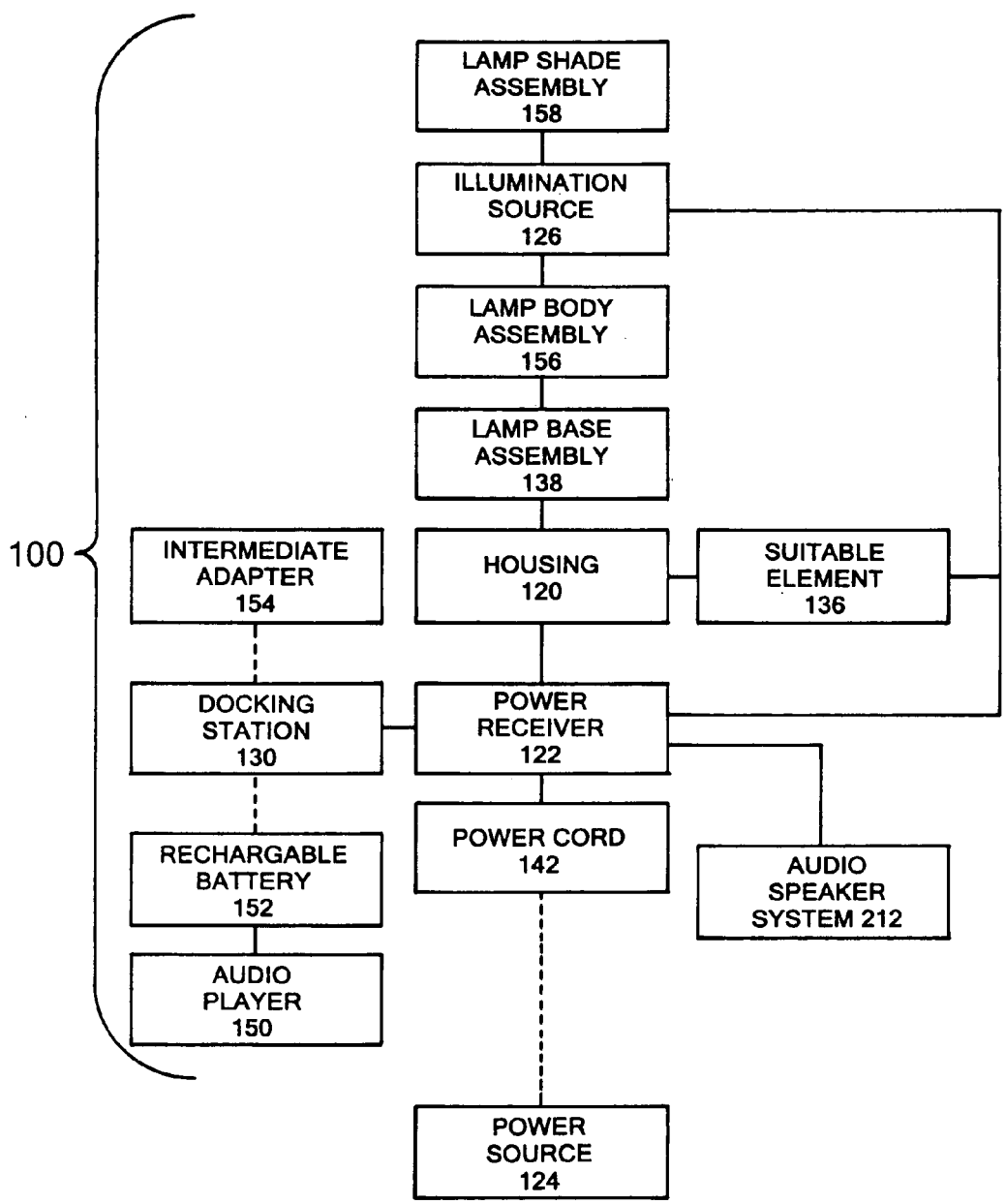
FIG. 1 depicts a block diagram of a holding device 100 of this invention capable of supporting an audio player 150.

Referring now to FIG. 1, holding device 100 includes a housing 120. Housing 120 has a power receiver 122, which is attachable to a power source 124 through power cord 142. Power receiver 122 is connected to an illumination source 126, audio speaker system 212, and docking station 130. The docking station 130 receives audio player 150. While audio player 150 is in docking station 130, the rechargeable battery 152 for audio player 150 receives a charge, and a connection between audio player 150 and audio speaker system 212 is achieved. In this fashion, audio player 150 can have sound distributed from audio speaker system 212.

Docking station 130 can receive any audio player 150 or appropriately configured rechargeable device. Also, intermediate adapter 154 may be inserted into docking station 130. The intermediate adapter 154 permits other devices to be charged by the same housing 120. Audio speaker system 212 permits the audio player 150 to have better sound quality.

Power source 124 can be direct (DC) or alternating current (AC) from any suitable source. Standard house current may be used, as well as an appropriate battery pack. The power receiver 122, when activated by power source 124, distributes power to illumination source 126, audio speaker system 212, docking station 130, and any other suitable element 136. For example, suitable element 136 may be a power outlet for receiving a standard electrical cord.

Between lamp base assembly 156 and illumination source 126 is lamp body assembly 156. Over illumination source 126 is lamp shade assembly 158. Thus illumination source 126 is covered by lamp shade assembly 158 and above lamp body assembly 156.

Figure 2:
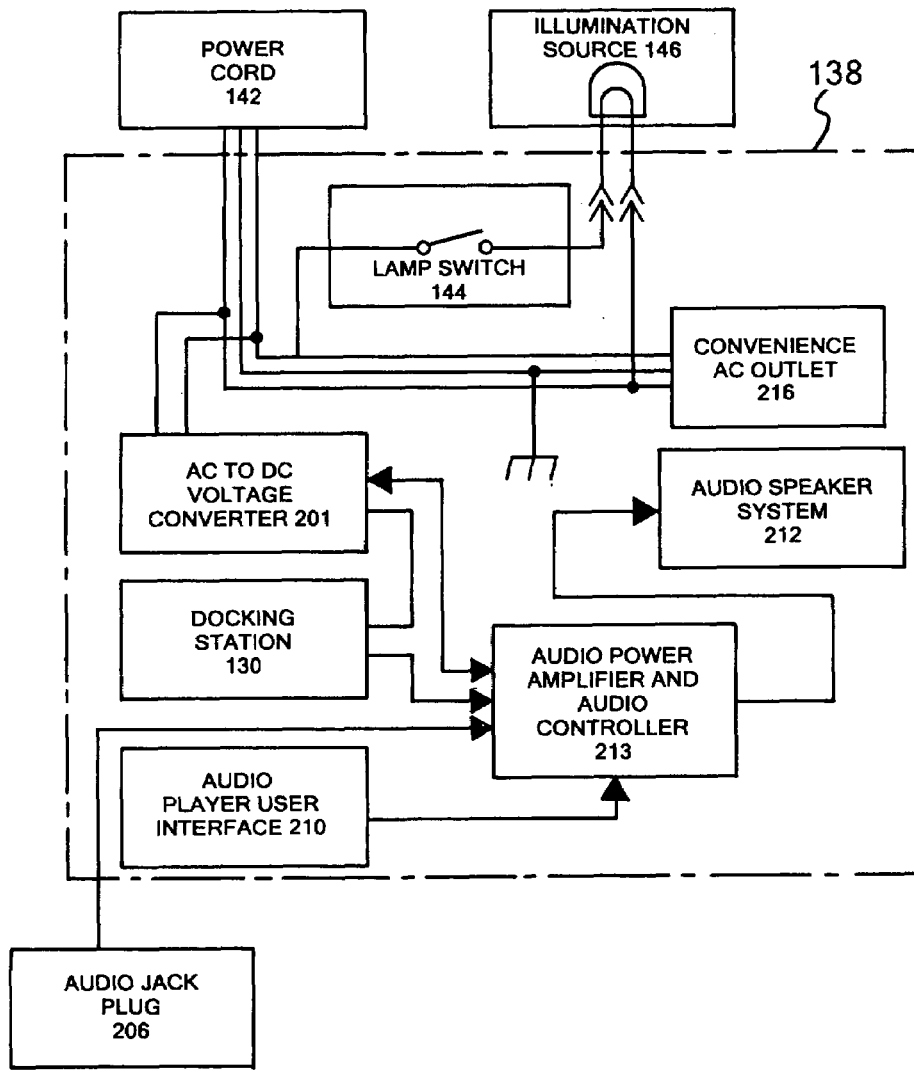
FIG. 2 depicts a system block diagram of holding device 100 of this invention capable of supporting audio player 150.

Adding FIG. 2 to consideration, this system consists of two major components, the lamp base assembly 138, and illumination source 126. The lamp base assembly 138 receives input AC voltage 166 from the power cord 142 which is attached to power source 124. Input AC voltage 166 is sent to lamp light 146 through a lamp switch 144. This switch 144 may be located within the lamp base assembly 138 or within illumination source 126. Lamp base assembly 138 is designed so that a variety of different styled lamp lights 146 can easily be mechanically and electrically coupled to the lamp base assembly 138. Input AC voltage 166 is also sent to a convenience alternating current (AC) outlet 216 to provide a power source for other audio players or miscellaneous devices.

Furthermore, AC to direct current (DC) voltage converter 201 converts the input AC voltage level 166 into levels that are compatible with these and other electrical, electrical mechanical, and electronic components that reside with the lamp base assembly 138. AC to DC voltage converter 201 provides power to the audio power amplifier and audio controller 213 that drives audio speaker system 212. Additionally, AC to DC voltage converter 201 provides power to audio player 150 that is attached in docking station 130. This powers and recharges audio player batteries 152 in audio player 150.

The audio power amplifier and audio controller 213 receives audio inputs from audio player 150 inserted in docking station 130, or from audio jack plug or audio phono plug 206. Audio jack plug or audio phono plug 206 allows other audio players, which are not physically compatible with docking station 130, to be used with audio speaker system 212. Audio player user interface 210 controls the audio system output power and loudness level.

Figure 3:
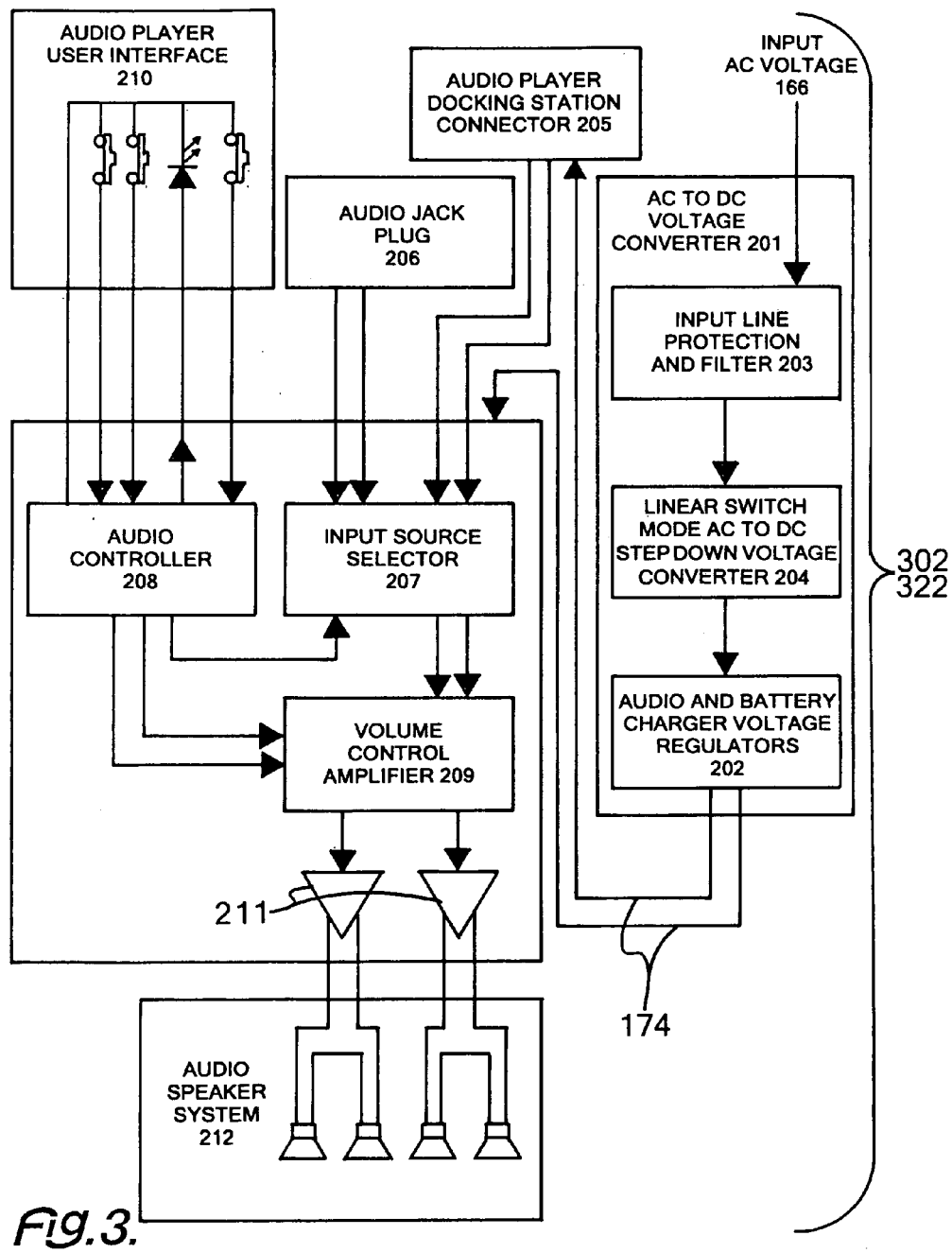
FIG. 3 is a detailed block diagram of the main components of FIG. 2.
Figure 4:
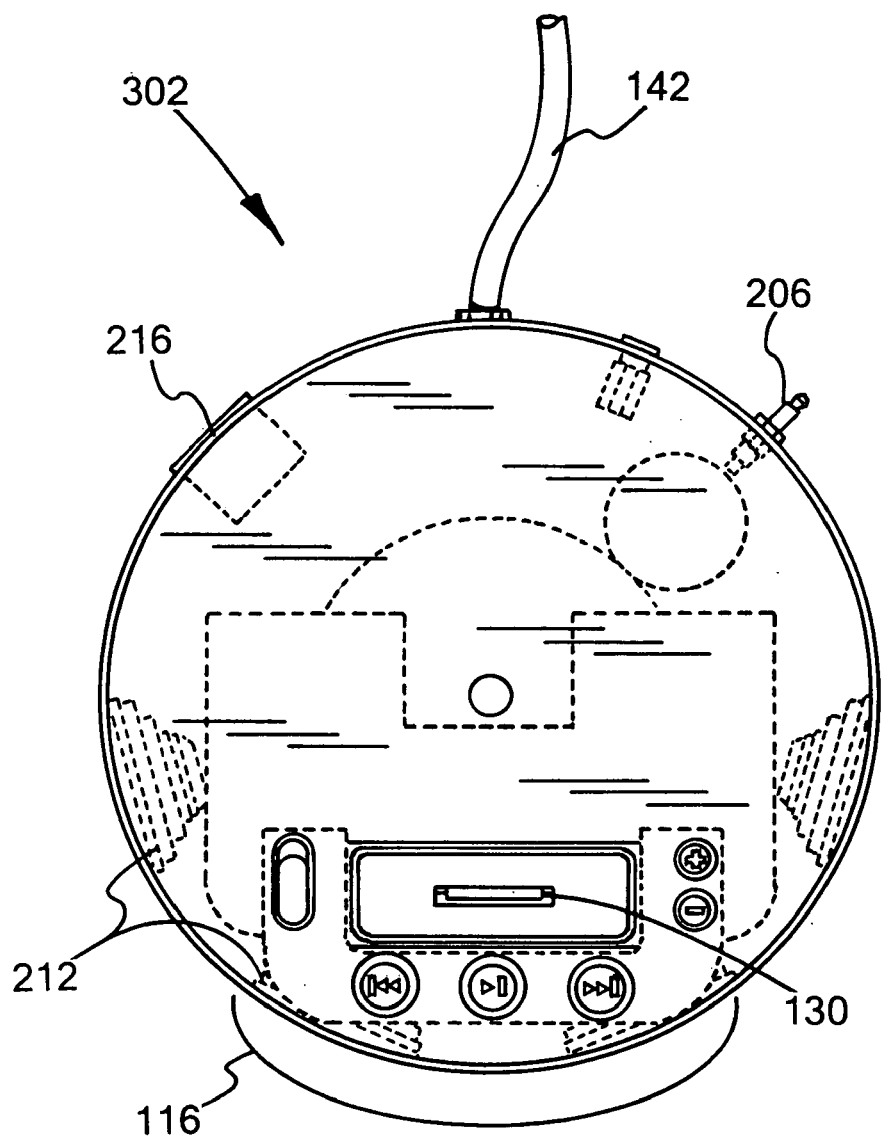
FIG. 4 depicts an top plan view of circular lamp base 302 of circular model holding device 306 of this invention capable of supporting audio player 150.
Figure 5:
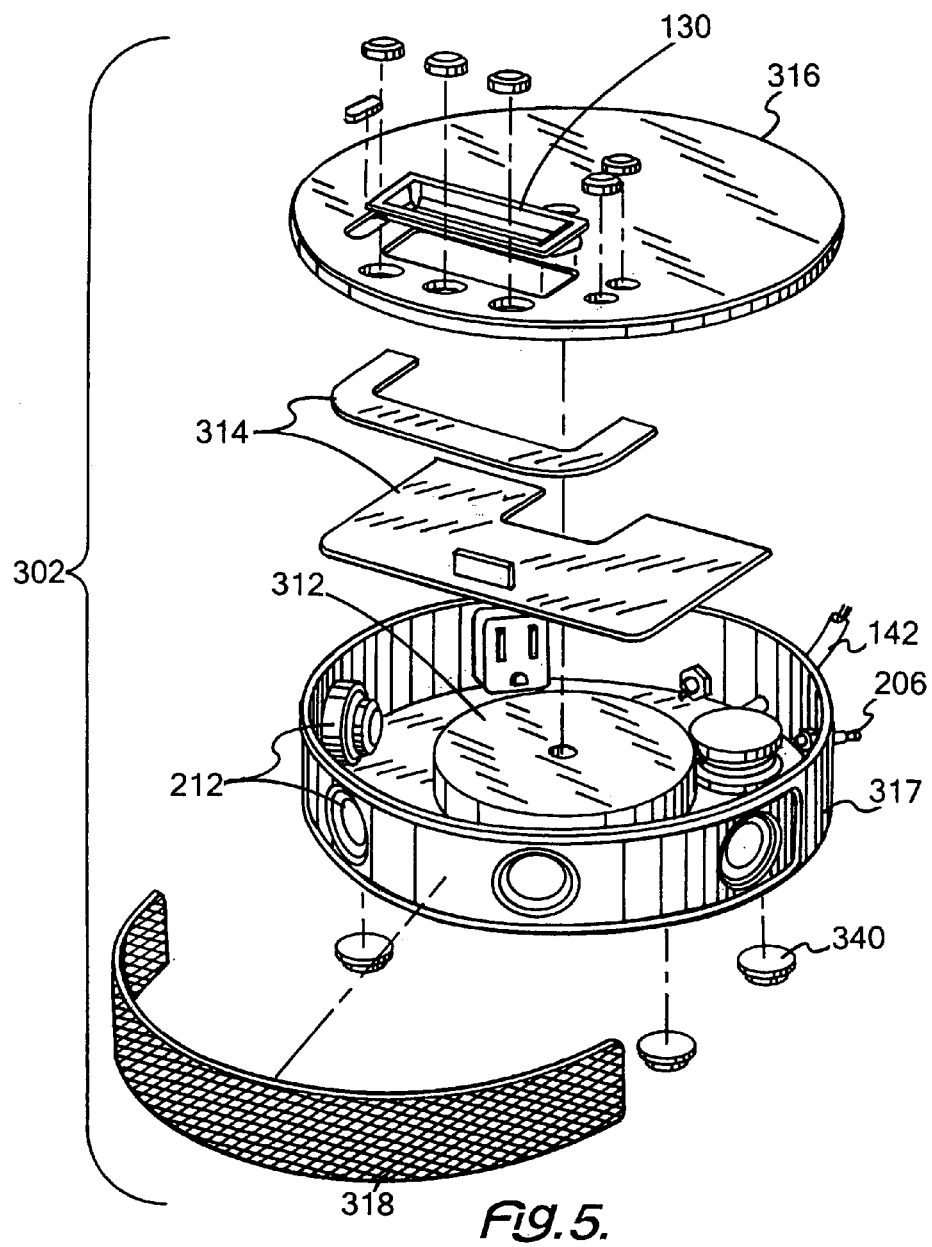
FIG. 5 depicts an exploded, perspective view of circular lamp base 302 of circular model holding device 306 of this invention capable of supporting audio player 150.
Figure 6:
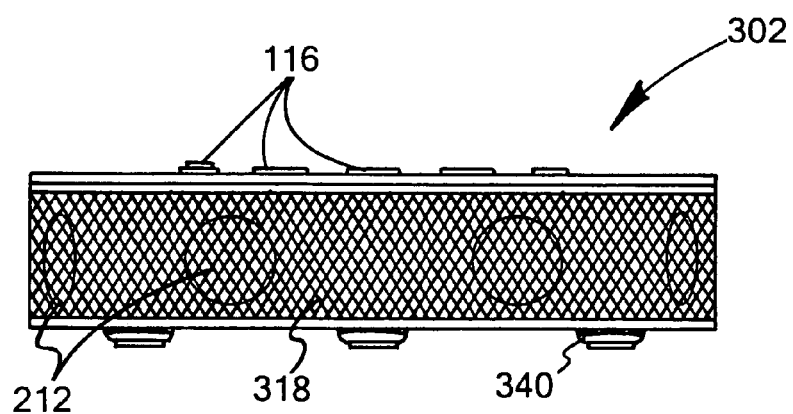
FIG. 6 depicts a front plan view of circular lamp base 302 of circular model holding device 306 of this invention capable of supporting audio player 150.
Figure 7:
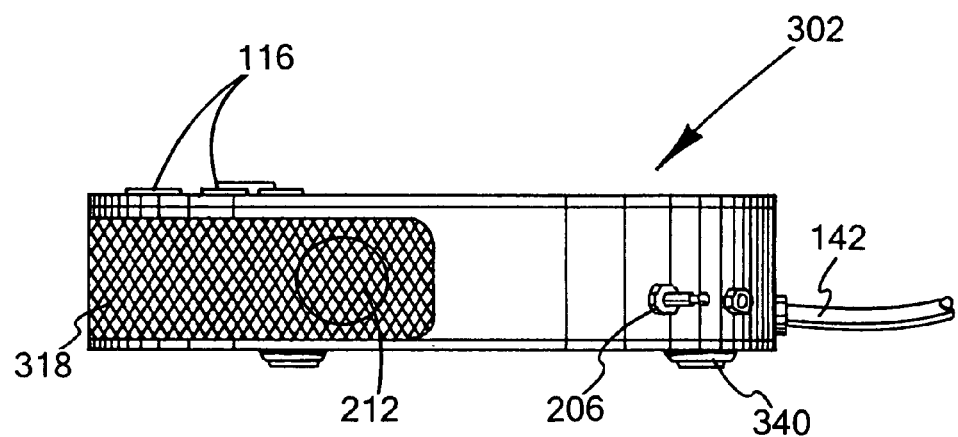
FIG. 7 depicts a rear, plan view of circular lamp base 302 of circular model holding device 306 of this invention capable of supporting audio player 150.
Figure 8:
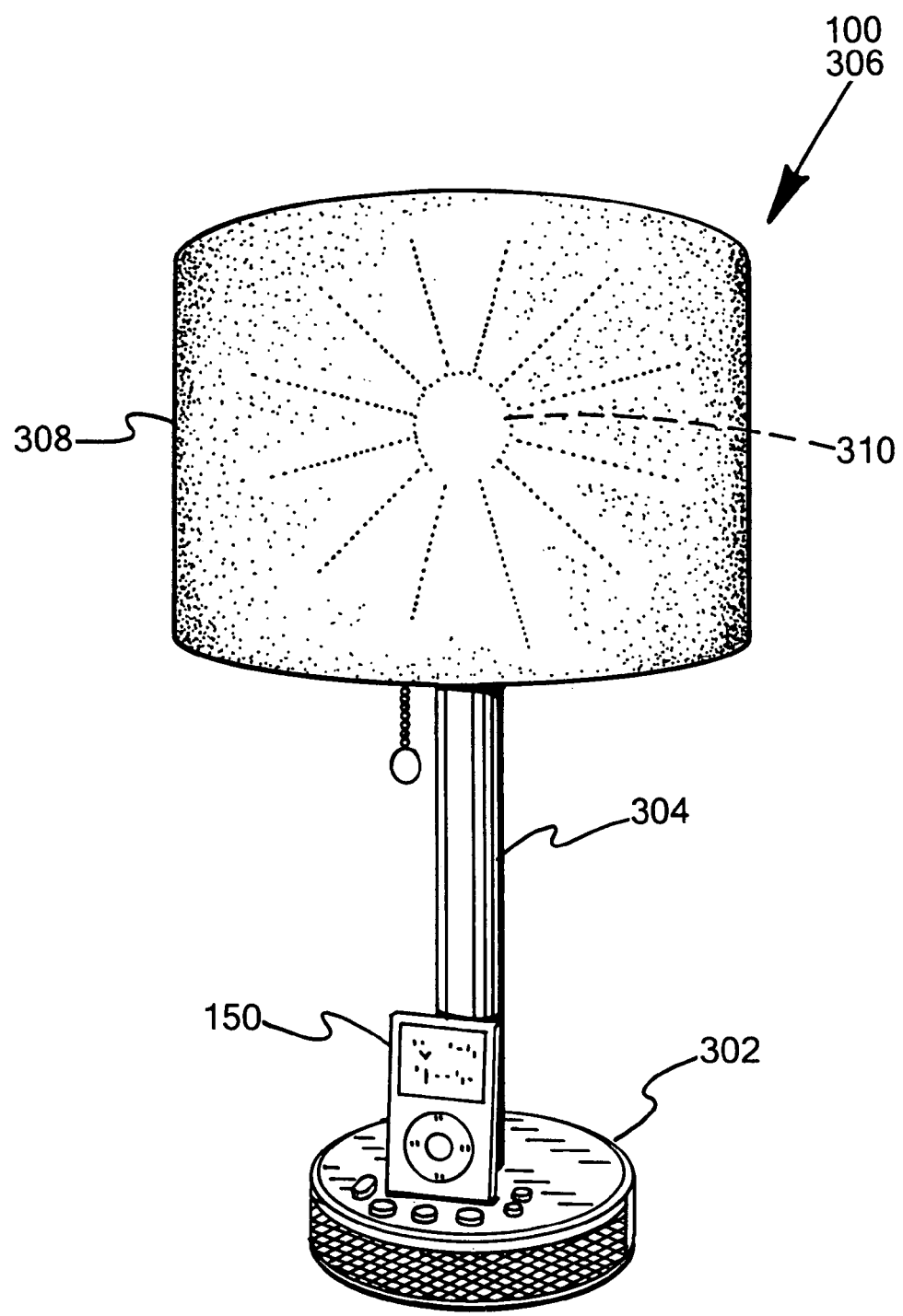
FIG. 8 depicts a perspective view of circular model holding device 306 of this invention capable of supporting audio player 150.
Figure 9:
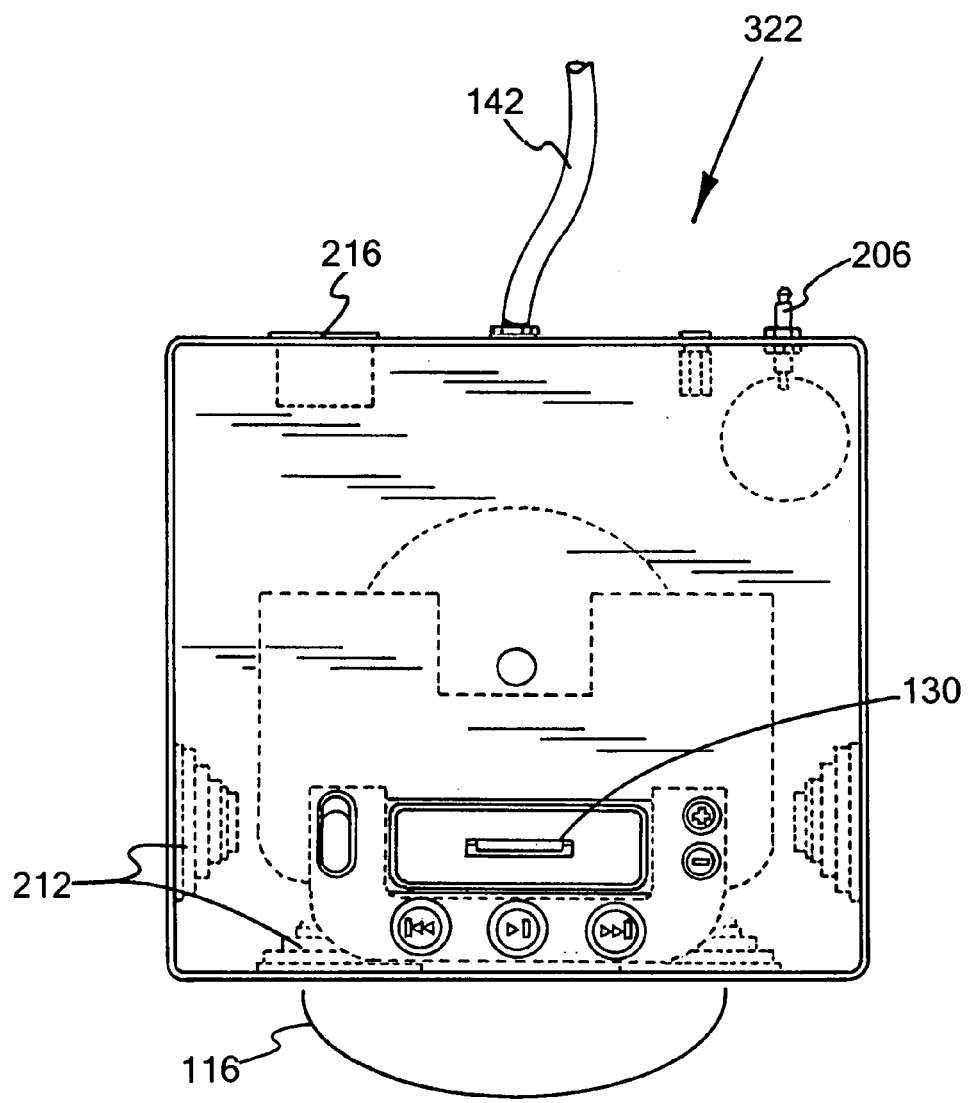
FIG. 9 depicts an top plan view of square lamp base 322 of square model holding device 326 of this invention capable of supporting audio player 150.
Figure 10:
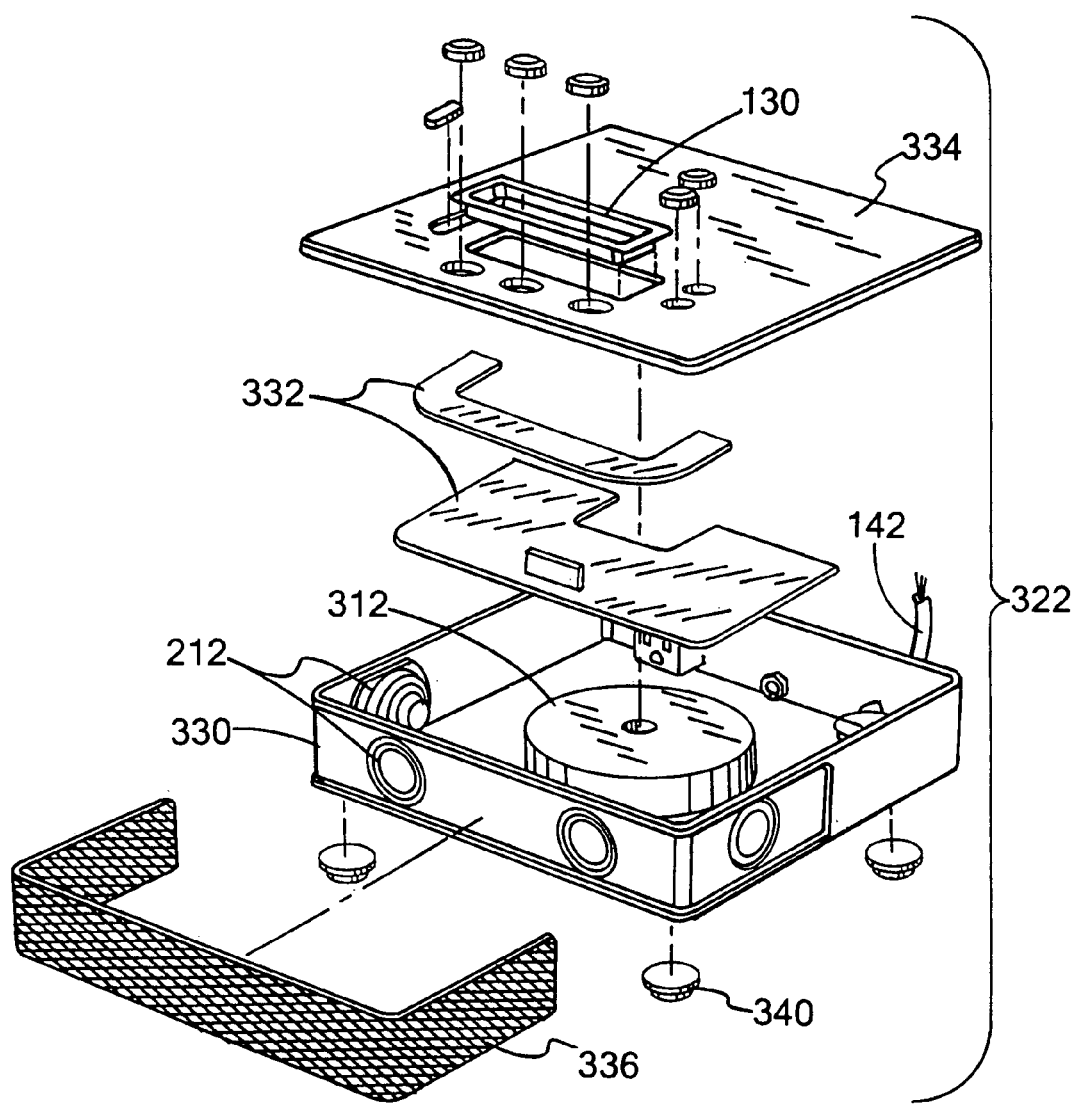
FIG. 10 depicts an exploded, perspective view of square lamp base 322 of square model holding device 326 of this invention capable of supporting audio player 150.
Figure 11:
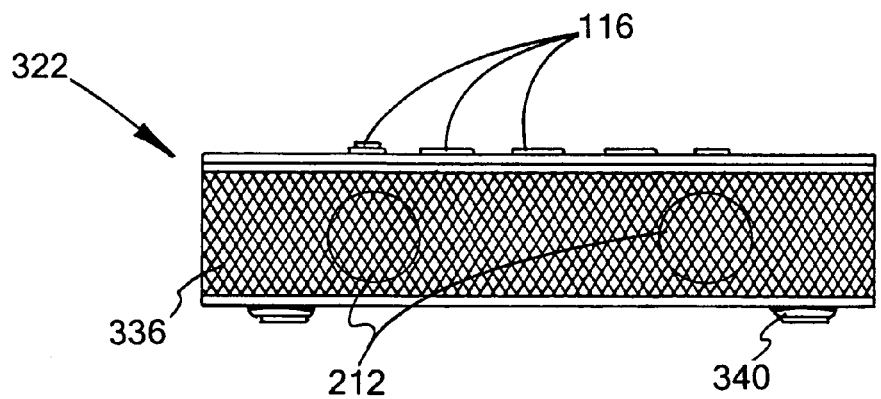
FIG. 11 depicts a front plan view of square lamp base 322 of square model holding device 326 of this invention capable of supporting audio player 150.
Figure 12:
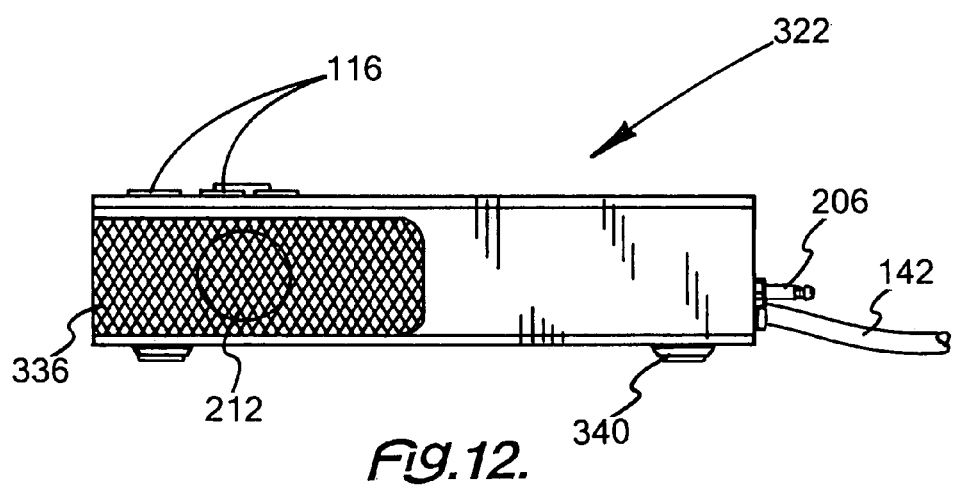
FIG. 12 depicts a rear plan view of square lamp base 322 of square model holding device 326 of this invention capable of supporting audio player 150.
Figure 13:
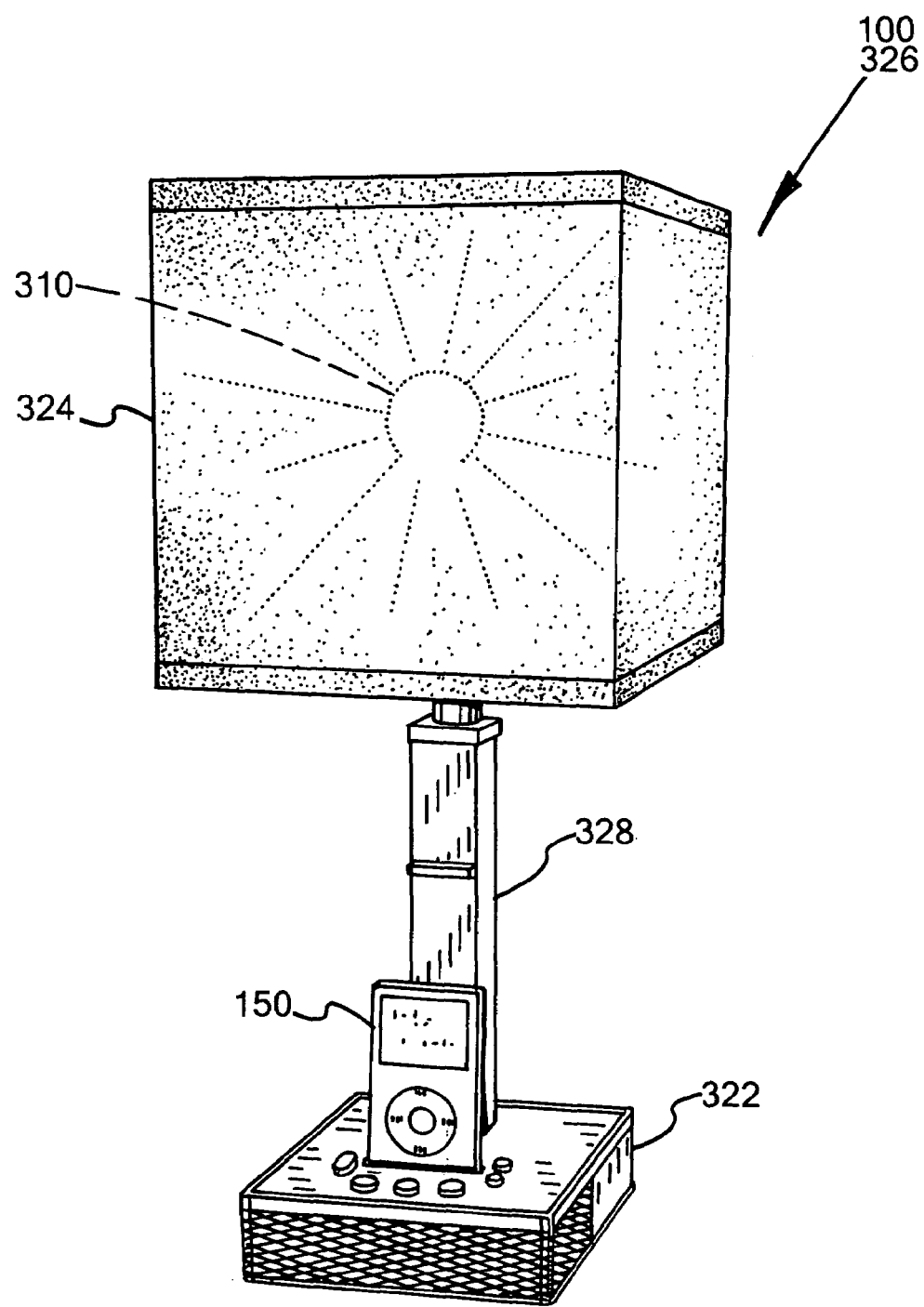
FIG. 13 depicts a perspective view of square lamp model device 326 of this invention capable of supporting audio player 150.

When FIG. 3 is added to consideration, the inner workings of lamp base assembly 138 become clear. AC to DC voltage converter 201 receives input AC voltage 166 and converts input AC voltage 166 into DC voltage 174 for audio speaker system 212, audio player 150 and docking station 130. Input line protection and filter 203 protects against surges in electricity. Linear or switch mode AC to DC step-down voltage converter 204 conditions and steps down input AC voltage 166 to electrically isolated DC voltage levels 174. Audio and battery charger voltage regulators 202 then regulates DC voltage 174 to the systems required voltage levels.

The DC voltage 174 is routed in two directions. First, audio player docking station connector 205 receives DC voltage 174. Audio player docking station connector 205 provides electrical connections to audio player 150 for powering and charging rechargeable battery 152. Second, DC power 174 supplies power to audio power amplifier and audio controller 213 which provides the necessary power level to drive audio speaker system 212.

Audio player user interface switches 116 provide a user with a means to adjust and set the desired audio listening level, allow audio player 150 to be shut down, and show when audio player 150 is active. Then, this information is sent to audio controller 208. Other forms of the audio player user interface 210 and audio player user interface switches 116 may be implemented.

Audio controller 208 determines the active audio source and sends this information to input source selector 207. Furthermore, audio controller 208 uses the signals received from audio player user interface 210 to control the output audio volume control amplifier 209. Volume control amplifier 209 additionally equalizes the frequency characteristics of the audio system.

Audio player docking station connector 205 receives stereo line level audio output signals and sends them to input source selector 207. Input source selector 207 also receives outputs from audio jack plug or audio phono plug 206. Input source selector 207 selects either outputs from audio player docking station 130 or the outputs from the audio jack plug or audio phono plug 206 to drive the audio system.

One implementation of the audio speaker system 212 is illustrated herein. However other implementations of the audio speaker system 212, audio power amplifier 211 and audio controller 208 may be selected to enhance the audio fidelity.

Adding FIG. 4, FIG. 5, FIG. 6, FIG. 7, and FIG. 8 to the consideration, circular model holding device 306 provides a preferred embodiment of this invention. Circular model holding device 306 includes a circular lamp base 302 connected to circular lamp stem 304. Circular lamp stem 304 has a light fixture 310 oppositely disposed from circular lamp base 302. Within circular lamp base 302 is docking station 130. Docking station 130 may be used to recharge audio player 150.

Circular lamp base 302 includes a circular weighted base 312 with circular support plates 314 mounted therein to support circuitry and other items therein in a standard fashion. Circular weighted base 312 is closed by circular cap 316, secured thereto in a standard fashion. Circular arced cover 318 can decorate and protect a front portion of circular weighted base 312.

Docking station 130 is also connected to an audio speaker system 212 which can transmit information from audio player 150, while it is placed in docking station 130. Thus, whatever information is stored on audio player 150 can be heard through audio speaker system 212. Furthermore, within circular lamp base 302 is audio jack plug or audio phono plug 206 which allows other portable sound devices to be used on circular model holding device 306. In this fashion, greater use can be made of audio player 150.

Audio player 150 can have many different functions. There are also many different types thereof. Whenever type is used, it can usually play music or unrecorded items. More advanced models have additional functions. With docking station 130, it becomes easier to keep the battery thereof appropriately charged. Audio speaker system 212, being connected to docking station 130, permits use thereof while charging takes place.

Adding FIG. 9, FIG. 10, FIG. 11, FIG. 12, and FIG. 13 to consideration, the dimensions of square model holding device 326 become apparent. The function of square model holding device 326 is identical to those of circular model holding device 306.

Square lamp base 322 includes a square weighted base 330 with square support plates 332 mounted therein to support circuitry and other items therein in a standard fashion. Square weighted base 330 is closed by square cap 334, secured thereto in a standard fashion. Square cover 336 can decorate and protect a front portion of square weighted base 330.

This application—taken as a whole with the abstract, specification, claims, and drawings being combined—provides sufficient information for a person having ordinary skill in the art to practice the invention as disclosed and claimed herein. Any measures necessary to practice this invention are well within the skill of a person having ordinary skill in this art after that person has made a careful study of this disclosure.

Because of this disclosure and solely because of this disclosure, modification of this method and device can become clear to a person having ordinary skill in this particular art. Such modifications are clearly covered by this disclosure.

What is claimed and sought to be protected by Letters Patent of the United States is:

1. A holding device for supporting a digital media player comprising:
    a) the holding device including a docking station for the digital media player, at least one speaker for the digital media player, an illumination source, and an external power source being operably interconnected to function in a cooperative fashion;
    b) the at least one speaker providing sound from the digital media player;
    c) the at least one speaker being connected to the docking station;
    d) the holding device further including a phone jack adapted to accept at least one other device;
    e) the holding device further including a housing;
    f) the housing including a power receiver attachable to a power source;
    g) the power receiver being connected to an illumination source, an audio speaker system, and a docking station;
    h) the docking station receiving the digital media player and connecting the digital media player to the audio speaker system; and
    i) the holding device having components and circuitry to power the audio speaker system, charge at least one battery of the digital media player, and power the illumination source concurrently.

2. The holding device of claim 1 further comprising:
    a) an intermediate adapter being inserted into the docking station, in order to provide for the charging of at least one other rechargeable device; and
    b) the audio speaker system permitting the digital media player to have an improved sound quality.

3. The holding device of claim 2 further comprising;
    a) the power source being direct current or alternating current;
    b) the power receiver being activated by the power source; and
    c) the power receiver providing power to elements of the holding device.

4. The holding device of claim 3 further comprising:
    a) the elements including at least two elements selected from the group consisting of an illumination source, an audio speaker system, a docking station, and a power outlet;
    b) the holding device including a lamp base assembly, and the illumination source; and
    c) the lamp base assembly receiving an input power to activate the power receiver.

5. The holding device of claim 4 further comprising:
    a) the lamp base assembly including a current converter for converting alternating current to direct current;
    b) the lamp base assembly including a voltage converter for converting an input voltage level into a level compatible with the at least one element; and
    c) the lamp base assembly including a power cord to supplement the docking station.

6. The holding device of claim 5 further comprising:
    a) the lamp base assembly further including an audio player user interface in order to control an output power and loudness level of the audio system;
    b) the lamp base assembly further including a regulator in order to control the voltage therein; and c) the lamp base assembly further including an input line protection and filter in order to protect the holding device against surges in electrical power.

7. The holding device of claim 6 further comprising:
a) the lamp base assembly further including at least one audio player user interface switch in order to provide adjustment and setting of a desired audio listening level, shutting down of the audio player, and showing the activity of the audio player;
b) the lamp base assembly further including an audio controller in order to determine an active audio source and provide information about the active audio source to an input source selector;
c) the audio controller using at least one signal received from the audio player user interface to control an output audio volume control amplifier; and
d) the volume control amplifier additionally equalizing a frequency characteristic of the audio system.

8. The holding device of claim 7 further comprising:
a) the lamp base assembly further including a docking station connector for the audio player docking station;
b) the docking station connector receiving stereo line level audio output signals and sending the signals to an input source selector; and
c) the input source selector receiving at least one output from the audio jack plug at the audio phono plug.

9. The holding device of claim 8 further comprising:
a) the input source selector selecting at least one output from the audio player docking station, the audio jack plug or the audio phono plug in order to drive the audio system; and
b) the docking station connector receiving stereo line level audio output signals and sending the signals to an input source selector.

10. The holding device of claim 9 further comprising:
a) the lamp base assembly further including a circular housing;
b) the circular housing including a circular lamp base connected to a circular lamp stem;
c) the circular lamp stem having a light fixture oppositely disposed from circular lamp base;
d) the circular lamp base including a circular weighted base with circular support plates mounted therein to support the elements therein;
e) the circular weighted base being closed by a circular cap, secured thereto; and
f) a circular arced cover decorating and protecting a front portion of the circular weighted base.

11. The holding device of claim 9 further comprising:
a) the lamp base assembly further including a square housing;
b) the square housing including a square lamp base connected to a square lamp stem;
c) the square lamp stem having a light fixture oppositely disposed from square lamp base;
d) the square lamp base including a square weighted base with square support plates mounted therein to support the elements therein;
e) the square weighted base being closed by a square cap, secured thereto; and
f) a square arced cover decorating and protecting a front portion of the square weighted base.

12. In a method for efficiently charging or using a digital media player, the improvement comprising:
a) providing a holding device with a housing wherein the holding device includes a docking station for the digital media player, at least one speaker for the digital media player, an illumination source, and an external power source being operably interconnected to function in a cooperative fashion;
b) providing sound from the digital media player through the at least one speaker;
c) interconnecting the at least one speaker and the docking station;
d) providing a phono jack adapted to accept at least one other device holding device;
e) including a power receiver in the housing;
f) connecting the power receiver to an illumination source, an audio speaker system, and a docking station;
g) placing the digital media player into the docking station for recharging or use;
h) providing direct current or alternating current for the power source;
i) activating the power receiver with the power source;
j) the power receiver providing power to all elements of the holding device;
k) providing the elements in the form of at least one element selected from the group consisting of an illumination source, an audio speaker system, a docking station, and a power outlet;
l) providing a lamp base assembly, and the illumination source for the holding device including;
m) activating the power receiver with the lamp base assembly receiving an input power;
n) converting alternating current to direct current;
o) converting an input voltage level into a level compatible with the at least one element;
p) providing the power cord to supplement the docking station; and
q) providing a docking station connector for the audio player docking station.

13. The method of claim 12 further comprising:
a) providing the lamp base assembly with an audio player user interface in order to control an output power and loudness level of the audio system;
b) providing the lamp base assembly further with a regulator in order to control the voltage therein;
c) protecting the lamp base assembly with an input line protection and filter in order to protect the holding device against surges in electrical power;
d) providing at least one audio player user interface switch in order to provide adjustment and setting of a desired audio listening level, shutting down of the audio player, and showing the activity of the audio player;
e) providing the lamp base assembly with an audio controller in order to determine an active audio source and provide information about the active audio source to an input source selector;
f) using at least one signal received from the audio player user interface to control an output audio volume control amplifier; and
g) equalizing a frequency characteristic of the audio system.

14. The method of claim 13 further comprising:
a) receiving stereo line level audio output signals and sending the signals to an input source selector;
b) receiving at least one output from the audio jack plug or the audio phono plug;
c) using compatible voltage and current levels; and
d) providing at least one switch to operate at least one element;
e) routing direct current to the audio player docking station connector and to an audio power amplifier and to an audio controller in order to provide a necessary power level to drive the audio speaker system; and (f) an intermediate adapter being inserted into the docking station, in order to provide for the charging of at least one other rechargeable device.

15. In a lamp assembly suitable for use in a hotel room or a motel room, the improvement comprising:
   a) the lamp assembly including a holding device for supporting a digital media player;
   b) the holding device including a docking station for the digital media player, at least one speaker for the digital media player, an illumination source, and an external power source being operably interconnected to function a cooperative fashion;
   c) the at least one speaker providing sound from the digital media player;
   d) the at least one speaker being connected to the docking station;
   e) the holding device further including a phono jack adapted to accept at least one other device;
   f) the holding device further including a housing;
   g) the housing including a power receiver attachable to a power source;
   h) the power receiver being connected to an illumination source, an audio speaker system, and a docking station; and
   i) the docking station receiving the digital media player and connecting the digital media player to the audio speaker system.

16. The lamp assembly of claim 15 further comprising:
   a) an intermediate adapter being inserted into the docking station, in order to provide for the charging of at least one other rechargeable device;
   b) the audio speaker system permitting the digital media player to have an improved sound quality;
   c) the power source being direct current or alternating current;
   d) the power receiver being activated by the power source;
   e) the power receiver providing power to all elements of the holding device;
   f) the elements including at least one element selected from the group consisting of an illumination source, an audio speaker system, a docking station, and a power outlet;
   g) the holding device including a lamp base assembly, and the illumination source;
   h) the lamp base assembly receiving an input power to activate the power receiver;
   i) the lamp base assembly including a current converter for converting alternating current to direct current; and
   j) the lamp base assembly including a voltage converter for converting an input voltage level into a level compatible with the at least one element.

17. The holding device of claim 16 further comprising:
   a) the lamp base assembly further including an audio player user interface in order to control an output power and loudness level of the audio system;
   b) the lamp base assembly further including a regulator in order to control the voltage therein;
   c) the lamp base assembly further including an input line protection and filter in order to protect the holding device against surges in electrical power;
   d) the lamp base assembly including the power cord to supplement the docking station;
   e) the lamp base assembly further including at least one audio player user interface switch in order to provide adjustment and setting of a desired audio listening level, shutting down of the audio player, and showing the activity of the audio player;
   f) the lamp base assembly further including an audio controller in order to determine an active audio source and provide information about the active audio source to an input source selector;
   g) the audio controller using at least one signal received from the audio player user interface to control an output audio volume control amplifier; and
   h) the volume control amplifier additionally equalizing a frequency characteristic of the audio system.

18. The holding device of claim 17 further comprising:
   a) the lamp base assembly further including a docking station connector for the audio player docking station;
   b) the docking station connector receiving stereo line level audio output signals and sending the signals to an input source selector;
   c) the input source selector receiving at least one output from the audio jack plug or the audio phono plug;
   d) the input source selector selecting at least one output from the audio player docking station, the audio jack plug or the audio phono plug in order to drive the audio system;
   e) the docking station connector receiving stereo line level audio output signals and sending the signals to an input source selector;
   f) the lamp base assembly further including a circular housing or a square housing;
   g) the lamp base connected to a lamp stem;
   h) the lamp stem having a light fixture oppositely disposed from circular lamp base;
   i) the lamp base including a weighted base with support plates mounted therein to support the elements therein;
   j) the weighted base being closed by a cap, secured thereto; and
   k) a cover protecting a front portion of the base.

* * * * *